Oct. 7, 1941.   P. WURZBURGER   2,258,528
PIPE UNION
Filed July 10, 1940
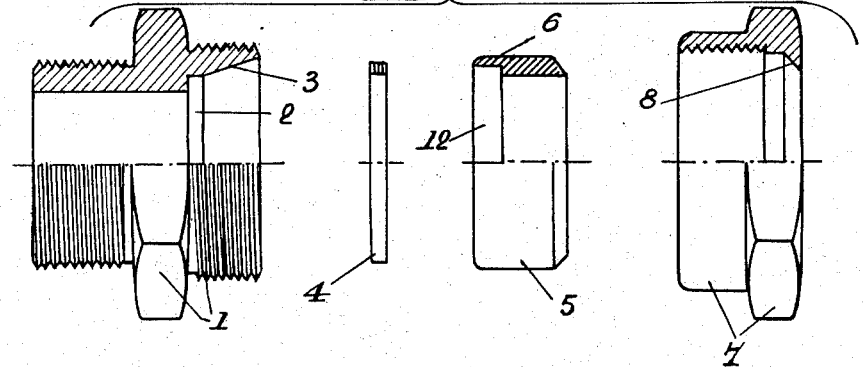
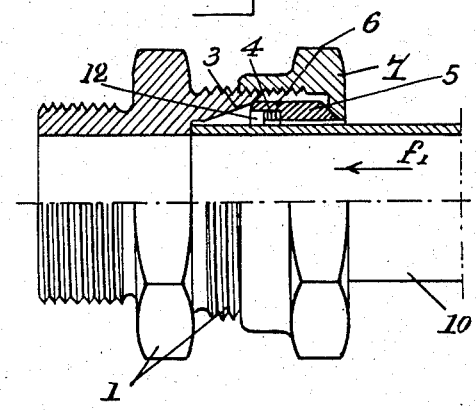
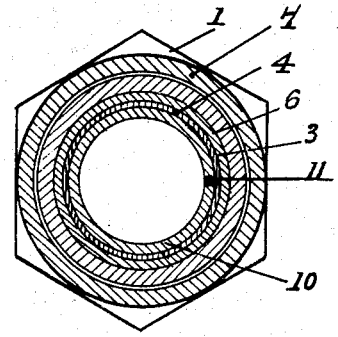   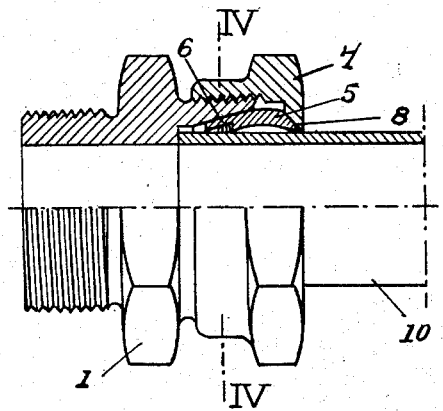
Paul Wurzburger
INVENTOR
Cooper, Kerr & Dunham
Attorneys Patented Oct. 7, 1941

2,258,528

UNITED STATES PATENT OFFICE 2,258,528

PIPE UNION

Paul Wurzburger, Paris, France, assignor to Patex Société Anonyme, Basel, Switzerland, a limited company of Switzerland Application July 10, 1940, Serial No. 344,690
In France March 18, 1940

1 Claim. (Cl. 285—122)

The object of the present invention is to provide a union for pipes, which will bear as snugly as possible upon the external surface of the pipe, even if this surface is irregular, and in every case ensures an excellently fluidtight joint.

One embodiment of a pipe union according to the invention is illustrated by way of example in the accompanying drawing, in which Figure 1 shows the various elements of the pipe union separated from one another, the upper half of each element being in axial section and the lower half in outside elevation;

Figure 2 is a similar view of the same elements in course of assemblage;

Figure 3 is a similar view showing the elements tightened up and locked together; and Figure 4 is a cross section on the line IV—IV in Figure 3.

The pipe union illustrated in the drawing comprises a nipple or sleeve 1, provided with a cavity 2 and a conical bore 3.

The sealing device consists of two rings 4 and 5, fitting one into the other. The outer ring 5 is of relatively hard metal, such as steel or brass, and its leading edge has an outer lip 6, which, at the time of tightening up, comes into engagement with the conical bore 3 of the nipple 1. The inner ring 4 is of malleable or plastic material. For example this ring may consist of a malleable metal, such as copper, aluminium or lead. This inner ring 4 engages under the outer lip 6 in a cavity or counterbore 12 in the outer ring 5. Finally the nut 7, which is screwed on to an external screw thread on the nipple 1, has a conical bore 8, which is pressed on to the conical end of the outer ring 5.

The assembling of this pipe union is clearly illustrated in Figures 2 and 3.

Figure 2 shows the beginning of the tightening operation. The nut 7 is first screwed on to the screw-threaded extension of the nipple 1. This nut 7 pushes, in the direction indicated by the arrow $f_1$, the sealing device, consisting of the two rings 4 and 5. The lip 6 of the outer ring 5 comes into contact with the bore 3 of the nipple.

As the tightening progresses, this lip 6 becomes deformed, as shown in Figure 3, and entirely imprisons the inner ring 4, in the sense that no portion of this malleable ring escapes to the outside of the outer ring 5.

The malleable inner ring 4 is then constrained to bear throughout its extent in a fluidtight manner upon the external surface of the pipe 10, as shown in Figure 3. The inner ring, being malleable, adapts itself snugly to the entire periphery of the tube 10, and assumes the shape of all the surface irregularities, including in particular, as indicated in Figure 4, the bead constituted by the welded seam. 11 of the two edges of the pipe, thereby maintaining an absolutely fluidtight joint.

To sum up, the invention provides a pipe union which is easy to connect, and which ensures in every case a perfectly tight joint.

What I claim is:

A pipe joint comprising a sleeve having an outwardly flared internal surface and an abutment, a pipe received by said sleeve and having an end in engagement with said abutment, an outer ring of relatively hard metal surrounding said pipe and having a counterbored leading edge deformed by said surface to substantially contact said pipe, an inner ring of relatively soft metal conforming to the surface of said pipe and imprisoned within the counterbore by said deformed edge and said pipe, and coupling means for forcing said edge along said surface to deform said edge to its position of substantial contact with said pipe.

PAUL WURZBURGER.